United States Patent
Sugahara

(10) Patent No.: US 7,561,309 B2
(45) Date of Patent: Jul. 14, 2009

(54) RECORDING APPARATUS AND RECORDING METHOD

(75) Inventor: Hiroto Sugahara, Aichi-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 547 days.

(21) Appl. No.: 11/391,454

(22) Filed: Mar. 29, 2006

(65) Prior Publication Data

US 2006/0221780 A1    Oct. 5, 2006

(30) Foreign Application Priority Data

Mar. 30, 2005    (JP)    ............... 2005-099782

(51) Int. Cl.
*H04N 1/21*    (2006.01)

(52) U.S. Cl. ............... 358/296; 358/1.1; 358/1.3; 347/1; 347/2

(58) Field of Classification Search ........... 358/1.1, 358/1.3, 501, 502, 401, 296; 347/1, 2, 101, 347/102
See application file for complete search history.

(56) References Cited

U.S. PATENT DOCUMENTS 6,147,777 A    11/2000    Jung
6,821,459 B1 *    11/2004    Usami ............... 264/1.33
2001/0046057 A1 *    11/2001    Kimura et al. ............... 358/1.8
2002/0109738 A1    8/2002    Ozawa

FOREIGN PATENT DOCUMENTS

| JP | 10128966 A | 5/1998 |
|---|---|---|
| JP | 2000301707 A | 10/2000 |
| JP | 2002046305 A | 2/2002 |
| JP | 2002531290 A | 9/2002 |
| JP | 2003001811 A | 1/2003 |
| WO | 0032399 A1 | 6/2000 |

* cited by examiner

*Primary Examiner*—Thomas D Lee
(74) *Attorney, Agent, or Firm*—Baker Botts L.L.P.

(57) ABSTRACT

To provide a recording apparatus for recording an image on a rotating recording medium, the recording apparatus including: a rotary driving unit which rotationally drives the recording medium; an ink-jet head for ejecting ink onto an image recording surface of the recording medium; and a control unit which switches between an image recording mode for ejecting ink onto the image recording surface by means of the ink-jet head while rotating the recording medium by the rotary driving unit, and a drying mode for drying the ink ejected onto the image recording surface by rotating the recording medium for a predetermined period of time by the rotary driving unit after the image recording mode. Accordingly, drying of the ink adhered to the recording medium is accelerated.

17 Claims, 16 Drawing Sheets

RECORDING APPARATUS AND RECORDING METHOD

BACKGROUND OF THE INVENTION

1. Field of the Invention

The present invention relates to a recording apparatus and a recording method for recording an image onto a recording medium having a flat image recording surface, while rotating the recording medium.

2. Description of the Related Art

As an apparatus for recording an image and the like onto an image recording surface on the side opposite to a data recording surface for recording data in a recording medium such as a CD or DVD, there is an apparatus provided with an ink-jet head which ejects ink droplets from a nozzle onto a rotating recording medium to record an image onto a disk drive which records data into the recording medium. For example, the printing apparatus disclosed in Published Japanese Translation of PCT International Publication for Patent Application No. 2002-531290 has a rotary motor for rotating a disk and an ink-jet head provided with a plurality of nozzles arranged in a row on a radial axis. This printing apparatus drives the ink-jet head while rotating the disk by the rotary motor, and records an image on a surface of the disk by ejecting ink droplets onto the disk.

In the printing apparatus described in Published Japanese Translation of PCT International Publication for Patent Application No. 2002-531290, rotation of the disk stops immediately after recording an image by ejecting ink onto the image recording surface of the disk. A user waits for the ink on the image recording surface to dry, and removes the disk from the printing apparatus. However, it is likely to take a long time for the ink to naturally dry after the image is recorded on the image recording surface. Therefore, a considerable amount of time may be required when recording images on a large number of image recording surface of disks. Moreover, only a small number of disks may be processed on the printing apparatus per unit time.

SUMMARY OF THE INVENTION

An object of the present invention is to provide a recording apparatus and a recording method capable of recording an image onto an image recording surface of a recording medium by using an ink-jet head, and thereafter immediately drying the ink on the image recording surface.

According to a first aspect of the present invention, there is provided a recording apparatus which records an image on a recording medium while rotating the recording medium, the recording apparatus including:
 a rotary driving unit which rotationally drives the recording medium;
 an ink-jet head which ejects ink onto an image recording surface of the recording medium; and
 a control unit which switches between an image recording mode for ejecting the ink onto the image recording surface by the ink-jet head while rotating the recording medium by the rotary driving unit, and a drying mode for drying the ink ejected onto the image recording surface by rotating the recording medium for a predetermined period of time by the rotary driving unit after the image recording mode.

According to this aspect of the present invention, after an image is recorded by ejecting ink onto the image recording surface while the recording medium being rotated, the relative speed of the air to the recording medium, on the image recording surface becomes larger compared to when the recording medium is in a stationary state, by rotating the recording medium for a predetermined period of time by means of the rotary driving unit. Therefore, the speed of the wind applied to the ink adhered to the image recording surface of the recording medium increases, whereby drying of the ink can be accelerated.

Further, in the image recording apparatus according to the present invention, the control unit may control the rotary driving unit such that a rotation speed of the recording medium in the drying mode is faster than a rotation speed of the recording medium in the image recording mode. In this case, by increasing the rotation speed of the recording medium in the drying mode more than in the image recording mode, the relative speed of the air to the recording medium, on the image recording surface of the recording medium becomes larger compared to when the recording medium is in the image recording mode, whereby drying of the ink can be further accelerated.

Further, in the recording apparatus of the present invention, the control unit may control the rotary driving unit such that a rotation speed of the recording medium in the drying mode is changed periodically. When the recording medium is rotated, there is generated airflow which follows the recording medium due to the viscosity of the air in the vicinity of the surface of the disk, and moves along the image recording surface in the direction of rotation of the recording medium. Therefore, when the recording medium is rotated, the relative speed of the air to the recording medium, on the image recording surface decreases, compared to a virtual case in which there is no air viscosity corresponding to the speed of the above airflow. However, when the rotation speed of the recording medium in the drying mode is changed periodically as described above, the airflow generated by the viscosity of the air in the vicinity of the image recording surface of the recording medium is disturbed, whereby the speed of the airflow decreases. As a result, the relative speed of the air to the recording medium, on the image recording surface becomes larger compared to the case in which the rotation speed of the recording medium is not changed periodically, thus drying of the ink can be further accelerated.

Further, the recording apparatus according to the present invention may further include a shielding member which is disposed, in proximity to the image recording surface, over an area ranging from the vicinity of a center of rotation (rotational center) of the recording medium to an outer peripheral portion of the recording medium. In this case, the airflow generated by the viscosity of the air in the vicinity of the image recording surface of the recording medium is disturbed by the shielding member, whereby the speed of the airflow decreases. As a result, compared to the case in which the shielding member is not provided, the relative speed of the air to the recording medium increases in a region on the image recording surface which faces the shielding member, and in a region which is close to the region facing the shielding member and disposed in the downstream side in the direction of rotation of the recording medium, thus drying of the ink can be further accelerated.

In this case, the shielding member may be disposed on an upper stream side of the ink-jet head in the direction of rotation of the recording medium. In this case, the shielding member disposed on the upstream side of the direction of rotation of the recording medium of the ink-jet head can prevent the phenomenon that, when the recording medium is rotated in the image recording mode, the airflow, which is generated by the viscosity of the air in the vicinity of the image recording surface, flows into between a nozzle of the ink-jet head and the image recording surface of the recording medium. Thus, a position at which the ink lands can be prevented as much as possible from being shifted by the airflow when the ink is ejected from the nozzle.

Further, in the recording apparatus according to the present invention, the shielding member may be inclined to a direction perpendicular to the direction of rotation of the recording medium, as viewed from a direction perpendicular to the image recording surface. In this case, most of the airflow generated by the viscosity of the air with the rotation of the recording medium can be directed to the inside or outside of the recording medium by the shielding member. Therefore, the speed of the airflow generated by the viscosity of the air flowing into between the shielding member and the image recording surface can be decreased. As a result, compared to the case in which the shielding member is not provided, the relative speed of the air to the recording medium increases in the region on the image recording surface which faces the shielding member, and in a region which is close to the region facing the shielding member and disposed in the downstream side in the direction of rotation of the recording medium, thus drying of the ink can be further accelerated.

In addition, in the recording apparatus according to the present invention, the shielding member may have an inclined surface and distance between the inclined surface and the image recording surface becomes larger toward the downstream in a direction of rotation of the recording medium. In this case, most of the airflow generated by the viscosity of the air with the rotation of the recording medium can be directed in a direction away from the image recording surface of the recording medium along the inclined surface, and the speed of the airflow generated by the viscosity of the air flowing into between the shielding member and the image recording surface can be decreased. As a result, compared to the case in which the shielding member is not provided, the relative speed of the air to the recording medium increases in the region on the image recording surface which faces the shielding member, and in a region which is close to the region facing the shielding member and disposed in the downstream side in the direction of rotation of the recording medium, thus drying of the ink can be further accelerated.

Further, in the recording apparatus according to the present invention, the shielding member may have a plurality of shielding column portions extending in a direction perpendicular to the image recording surface toward the image recording surface. In this case, the shielding column portions provided on the shielding member block the movement of the airflow flowing into between the shielding member and the image recording surface, whereby the speed of the airflow flowing into between the shielding member and the image recording surface can be reduced. As a result, compared to the case in which the shielding member is not provided, the relative speed of the air to the recording medium increases in the region on the image recording surface which faces the shielding member, and in a region which is close to the region facing the shielding member and disposed in the downstream side in the direction of rotation of the recording medium, thus drying of the ink can be further accelerated.

Further, in the recording apparatus according to the present invention, an inside of the shielding member is formed with an airflow path which returns an airflow, flowing along the recording medium from an upstream side in a direction of rotation of the recording medium, to the upstream side in the direction of rotation. In this case, the direction of movement of the airflow, which is generated by the viscosity of the air with the rotation of the recording medium and flows into the airflow path inside the shielding member, can be inverted by the airflow path and the airflow can be returned to the upstream side of the direction of rotation, whereby the speed of the airflow flowing into the between the shielding member and the image recording surface can be reduced. As a result, compared to the case in which the shielding member is not provided, the relative speed of the air to the recording medium increases in the region on the image recording surface which faces the shielding member, and in the region which is close to the region facing the shielding member and disposed in the downstream side in the direction of rotation of the recording medium, thus drying of the ink can be further accelerated.

Further, in the recording apparatus according to the present invention, the shielding member may be disposed so as to face an entire region of the image recording surface of the recording medium, excluding a region on the image recording surface of the recording medium which is placed opposite to the ink-jet head. In this case, the shielding member is disposed so as to face a wide range of the image recording surface of the recording medium. Therefore, the airflow generated by the viscosity of the air with the rotation of the recording medium can be prevented from flowing into between the shielding member and the image recording surface, and the speed of the airflow in the vicinity of the image recording surface can be reduced. As a result, compared to the case in which the shielding member is not provided, the relative speed of the air to the recording medium is increased throughout substantially the entire region on the image recording surface of the recording medium, and drying of the ink can be further accelerated.

The recording apparatus according to the present invention may further include a data-recording head which records data on a data recording surface formed on a side of the recording medium, the side being opposite to the image recording surface of the recording medium, wherein the ink-jet head and the data-recording head can be disposed so as to be opposite to each other with the recording medium intervening therebetween. According to this configuration, one recording apparatus can perform image recording onto the image recording surface of the recording medium and data recording onto the data recording surface of the recording medium. Moreover, the ink-jet head and the data-recording head are disposed so as to be opposite to each other with the recording medium intervening therebetween, thus inks of the ink-jet head are hardly adhered to the data-recording head. Accordingly, the data-recording head hardly breaks down.

According to a second aspect of the present invention, there is provided a recording apparatus which records an image on a recording medium while rotating the recording medium, the recording apparatus including:

a rotary driving unit which rotationally drives the recording medium;

an ink-jet head which ejects ink onto an image recording surface of the recording medium; and a shielding member which is disposed in proximity to the image recording surface over an area ranging from the vicinity of a center of rotation of the recording medium to an outer peripheral portion of the recording medium.

According to this configuration, the airflow generated by the viscosity of the air with the rotation of the recording medium is disturbed when an image is recorded onto the image recording surface of the recording medium, whereby the speed of the airflow flowing into between the shielding member and the image recording surface can be reduced. Accordingly, compared to the case in which the shielding member is not provided, the relative speed of the air to the recording medium increases in the region on the image recording surface which faces the shielding member, and in the region which is close to the region facing the shielding member and disposed in the downstream side in the direction of rotation of the recording medium, thus drying of the ink can be further accelerated during recording of an image onto the image recording surface.

According to a third aspect of the present invention, there is provided a method of recording an image on a recording medium having a data recording surface on which data is recorded and an image recording surface on which an image is recorded with a recording apparatus having a data-recording head and an ink-jet head, the method including the steps of:

recording data on the data recording surface with the data-recording head while rotating the recording medium;

recording an image on the image recording surface with the ink-jet head while rotating the recording medium; and drying the image recorded on the image recording surface by rotating the recording medium, wherein a rotation speed of the recording medium when recording an image on the image recording surface is different from a rotation speed of the recording medium when drying the image recorded on the image recording surface.

In the recording method according to the present invention, the rotation speed of the recording medium when drying the image recorded on the image recording surface may be faster than the rotation speed of the recording medium when recording an image on the image recording surface.

Furthermore, in the recording method according to the present invention, the rotation speed of the recording medium may be changed periodically when drying the image recorded on the image recording surface.

DESCRIPTION OF THE PREFERRED EMBODIMENTS

Embodiments of the present invention are described hereinafter with reference to the drawings, but the present invention is not limited to these embodiments. The present embodiment is an example in which the recording apparatus of the present invention is applied to a disk drive for recording data on an optical disk such as a CD-R and CD-RW.

First Embodiment

Figure 1:
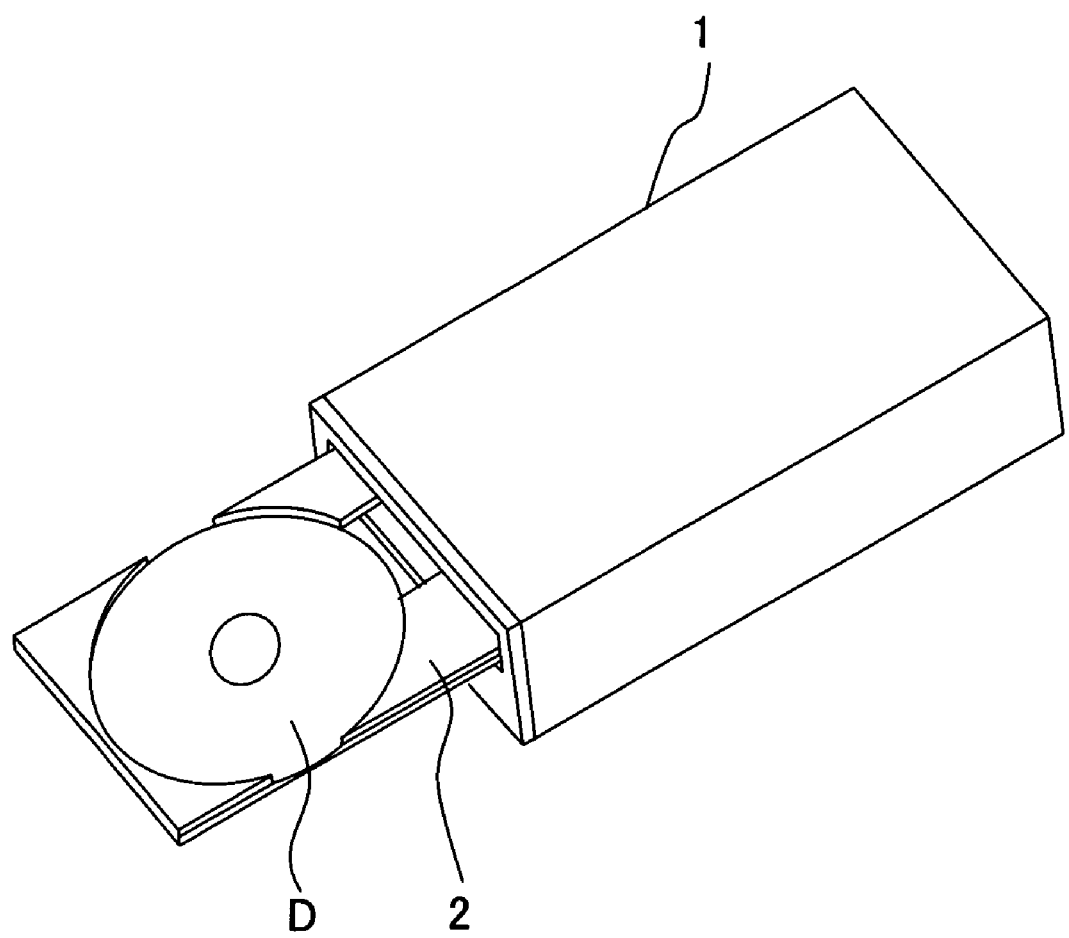
FIG. 1 is an external perspective view of a disk drive according to a first embodiment of the present invention.

FIG. 1 is an external perspective view of a disk drive 1 (recording apparatus) according to the present embodiment. As shown in FIG. 1, the chassis of the disk drive 1 is so-called half-height size, and is the same as the chassis used an ordinary CD-ROM or CD-R/RW drive. An optical disk D as a recording medium is, for example, a CD-R, CD-RW, or the like, and has the shape of a circular plate. One of the surfaces of the optical disk D is a flat image recording surface Da (see FIG. 2) for recording an image or the like, and the other surface thereof is a flat data recording surface Db (see FIG. 2) for recording data. The disk drive 1 is a recording apparatus for recording an image on the image recording surface Da of the optical disk D and recording data on the data recording surface Db. As shown in FIG. 1, the disk drive 1 is provided with a loading tray 2 for inserting the optical disk D into the disk drive 1 or taking the optical disk D out of the disk drive 1. The optical disk D is placed on the loading tray 2, facing up the image recording surface Da (the image recording surface Da is directed so as not to face the loading tray 2).

Figure 2:
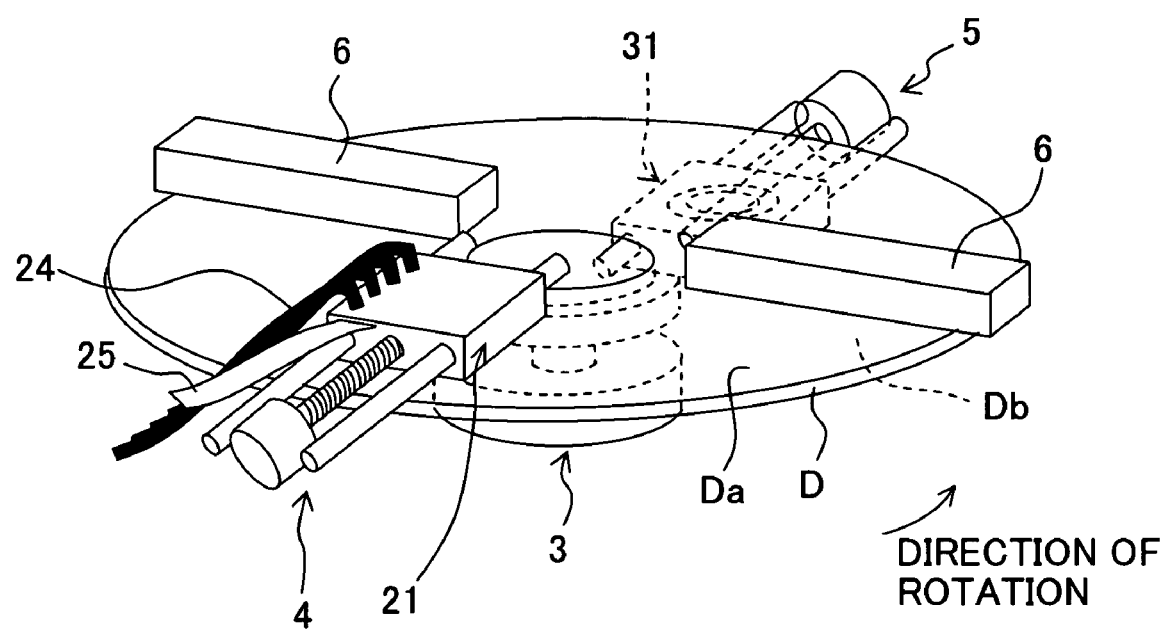
FIG. 2 is a schematic perspective view showing a state of the inside of the disk drive when a loading tray of FIG. 1 is inserted into the disk drive.

FIG. 2 is a schematic perspective view showing the inside of the disk drive 1 when the optical disk D is placed on the loading tray 2 as shown in FIG. 1 and the loading tray 2 of is inserted into the disk drive 1. As shown in FIG. 2, the optical disk D is installed on a rotary driving unit 3 in the disk drive 1. It should be noted that FIG. 2 omits illustration of a part of the rotary driving unit 3. In this case, an image recording apparatus 4 having an ink-jet head 22 is disposed in an upper side of the image recording surface Da of the optical disk D, and an ink ejection surface 26 (see FIG. 5) of the ink-jet head 22 and the image recording surface Da face each other. Furthermore, on the upper surface of the image recording surface Da of the optical disk D, rectangular solid shielding members 6 extending in parallel to the image recording surface Da are disposed at both sides of the image recording apparatus 4 respectively, the both sides being obtained by rotating the optical disk D around the rotational center of the optical disk D by ±90 degrees respectively from the position at which the image recording apparatus 4 is arranged.

A data recording apparatus 5 having a data-recording head 32 is disposed in a lower side of the data recording surface Db of the optical disk D, and a laser output surface 34 (see FIG. 5) of the data-recording head 32 and the data recording surface Db face each other. The data recording apparatus 5 having the data-recording head 32 is disposed in a position opposite to the image recording apparatus 4 with the optical disk D intervening therebetween, that is, the position diagonally opposite to the image recording apparatus 4 with respect to the center of the optical disk D. Operations of the rotary driving unit 3, the image recording apparatus 4, and the data recording apparatus 5 are controlled by a control unit 7 (see FIG. 6) configured with a CPU (Central Processing Unit), ROM (Read Only Memory), RAM (Random Access Memory) and the like inside the disk drive 1.

Figure 3:
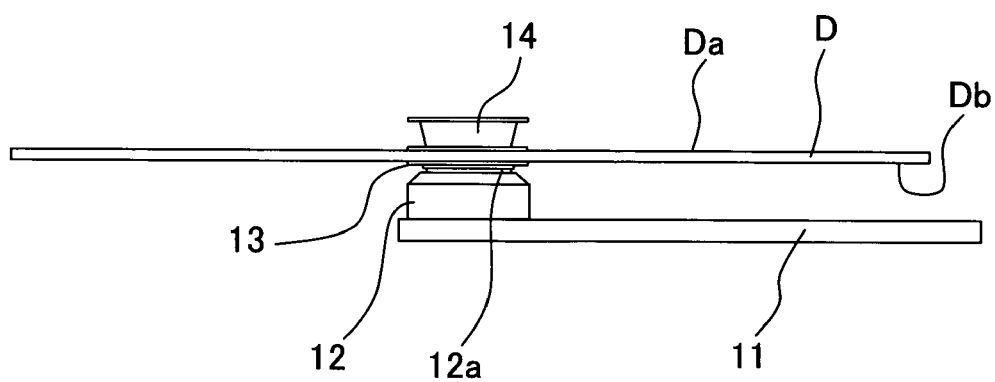
FIG. 3 is a side view showing a rotary driving unit of FIG. 2.

The rotary driving unit 3 is described with reference to FIG. 3. FIG. 3 is a side view showing the rotary driving unit 3 of FIG. 2. The rotary driving unit 3 is a unit for rotary driving the optical disk D, and a spindle motor 12 is disposed on an upper surface of a supporting member 11 as shown in FIG. 3. The spindle motor 12 has at its upper end portion a rotation axis 12a extending upward, and an upper portion of the rotation axis 12a is provided with a turn table 13. Upper surface of the turn table 13 is circular and flat, and is provided so as to be perpendicular with respect the rotation axis 12a. The optical disk D is disposed on the upper surface of the turn table 13, facing up the image recording surface Da (the optical disk D is disposed so that the surface on the data recording surface Db of the optical disk D faces the upper surface of the turn table 13). Further, a clamper 14 in which a bottom surface thereof circular and flat is disposed on an upper surface of the optical disk D (image recording surface Da). The optical disk D is held between the turn table 13 and the clamper 14. The turn table 13 has built-in a permanent magnet, and the clamper 14 has built-in an iron steel piece. Therefore, when the loading disk 2 is inserted into the disk drive 1, the clamper 14 is pulled to the turn table 13 by the magnetic force and moved to the upper surface of the optical disk D, whereby the optical disk D is held between the turn table 13 and the clamper 14. Then, when recording an image on the image recording surface Da of the optical disk D by means of the image recording apparatus 4, when drying the ink on the image recording surface Da, and when recording data on the data recording surface Db of the optical disk D by means of the data recording apparatus 5, the rotary driving unit 3 rotates the rotation axis 12a of the spindle motor 12 to rotate the turn table 13 and the clamper 14, whereby the optical disk D held therebetween is rotary driven.

Figure 4:
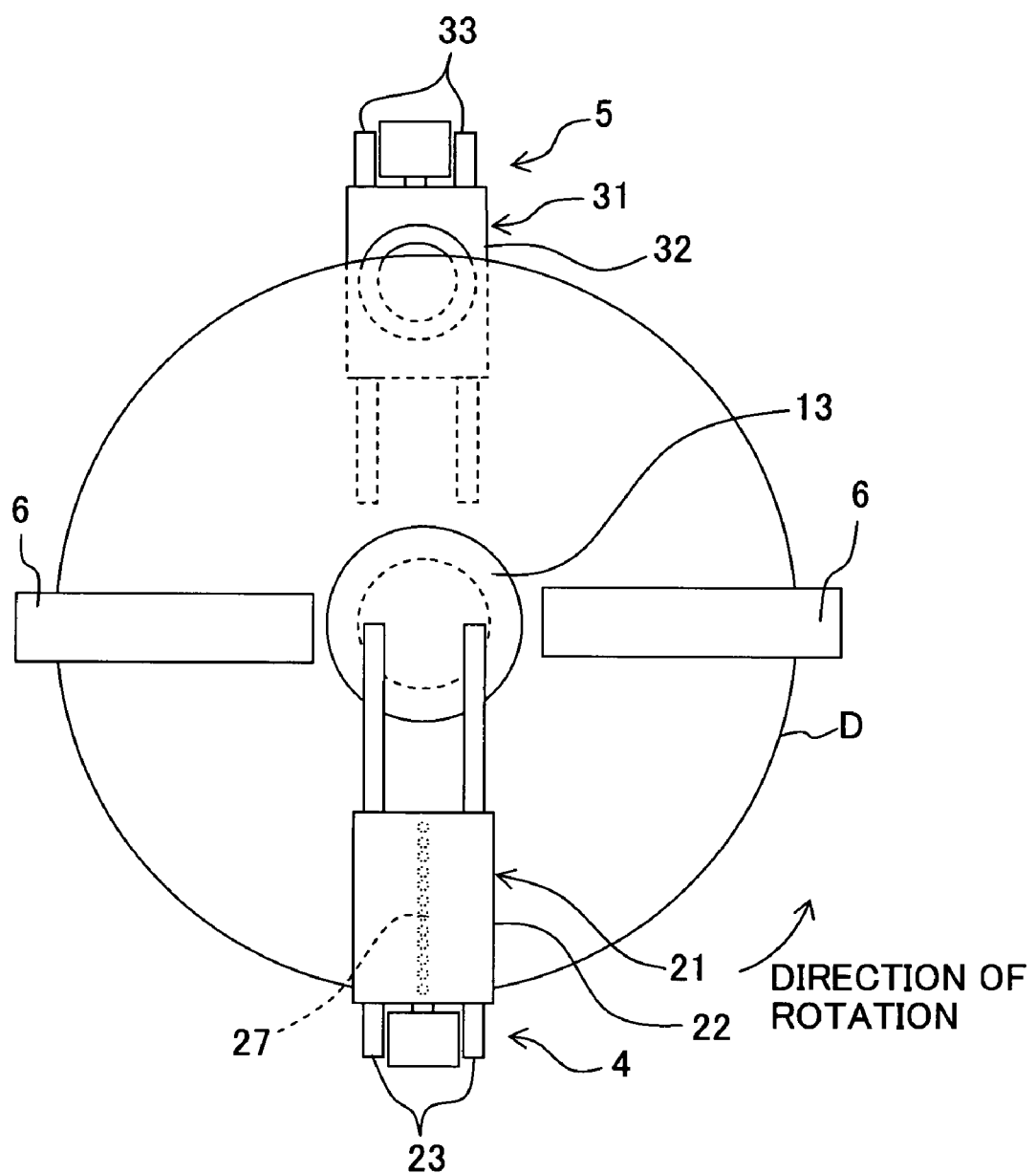
FIG. 4 is a plan view of FIG. 2.
Figure 5:
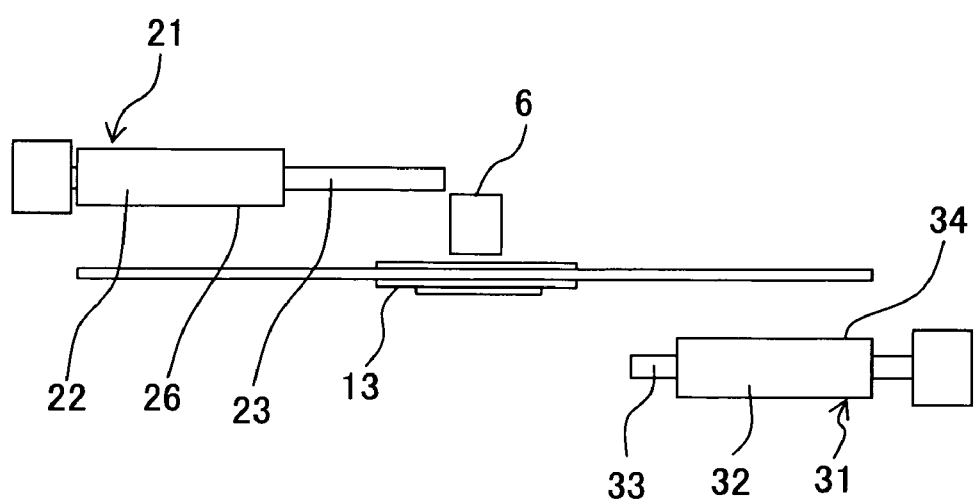
FIG. 5 is a side view of FIG. 2.

Next, the image recording apparatus 4 is described with reference to FIG. 2, FIG. 4, and FIG. 5. FIG. 4 is a plan view showing the image recording apparatus 4 and data recording apparatus 5 illustrated in FIG. 2, and FIG. 5 is a side view showing the image recording apparatus 4 and data recording apparatus 5 illustrated in FIG. 2. However, FIG. 4 and FIG. 5 show only a part of the rotary driving unit 3.

As shown in FIG. 2, FIG. 4, and FIG. 5, the image recording apparatus 4 has a carriage 21 including the ink-jet head 22, two guide axes 23 supporting the carriage 21, an ink supply tube 24, and a FFC (flexible flat cable) 25. The carriage 21 is supported together with the ink-jet head 22 movably along the guide axes 23. The two guide axes 23 are cylindrical rod-like bodies an d are disposed parallel to each other. The two guide axes 23 extend from the inside to the outside of the optical disk, that is, in the radial direction of the optical disk D and in parallel to the image recording surface Da of the optical disk D.

The ink-jet head 22 is a serial type ink-jet head and has a plurality of nozzles 27 ejecting ink droplets onto the image recording surface Da of the optical disk D. A bottom surface of the ink-jet head 22 (surface on the optical disk D side) is a flat ink ejection surface 26 which is parallel to the extending direction of the guide axes 23, and a large number of ejection ports of the nozzles 27 are formed in a row along the radial direction of the optical disk D. It should be noted that FIG. 4 shows only 12 nozzles of the nozzles 27 in order to simplify the illustration.

The ink supply tube 24 is connected the ink-jet head 22 and an ink tank which is not shown. Ink is supplied from the ink tank to the ink-jet head 22 via the ink supply tube 24. The FFC 25 is connected to an actuator (not shown) of the ink-jet head 22, and drive voltage is applied from an unshown driver IC provided on an upper side of the FFC 25 to the actuator. The drive voltage is applied to the actuator and the pressure is applied to an unshown pressure chamber communicated to each of the plurality of nozzles 27, whereby the ink-jet head 22 ejects ink droplets from the nozzles 27. In this manner, the ink-jet head 22 moves in the radial direction of the optical disk D along the guide axes 23 while ejecting the ink droplets from the nozzles 27 onto the image recording surface Da of the optical disk D, thereby recording an image. When data is not written on the image recording surface Da, the image recording apparatus 4 may also move the carriage 21 along the guide axes 23 to an unshown save position located outer than the position where the carriage 21 overlaps the optical disk D in a plan view.

Next, the data recording apparatus 5 is described with reference to FIG. 2, FIG. 4, and FIG. 5. As shown in FIG. 2, FIG. 4, and FIG. 5, the data recording apparatus 5 includes a carriage 31 and two guide axes 33. The carriage 31 has the data-recording head 32, is supported along with the data-recording head 32 by the two guide axes 33, and is supported movably along the extending direction of the guide axes 33. An upper surface of the data-recording head 32 (a surface facing the data recording surface Db of the optical disk D) is the laser output surface 34 which is parallel to the data recording surface Db, and a laser beam can be emitted from the laser output surface 34 to the data recording surface Db. The two guide axes 33 are cylindrical rod-like bodies parallel to each other, extend from the inside toward the outside of the optical disk D, that is, in the radial direction of the optical disk D, and are disposed so as to be parallel to the data recording surface Db. The data-recording head 32 emits a laser beam from the laser output surface 34 to the data recording surface Db to record data, while moving in the radial direction of the optical disk D along the guide axis 33. When data is not written on the data recording surface Db, the data recording apparatus 5 may also move the carriage 31 along the guide axes 33 to an unshown save position located outer than the position where the carriage 31 overlaps the optical disk D in a plan view.

The shielding members 6 are described with reference to FIG. 4 and FIG. 5 next. As shown in FIG. 4 and FIG. 5, the two shielding members 6 are in the form of a rectangular solid of the same size, and each of them extends, in proximity to the image recording surface Da, over an area ranging from the vicinity of the rotational center of the optical disk D to an outer peripheral portion. Specifically, the longest edge of the shielding member extends across the optical disk D in the radial direction from the rotational center of the optical disk D in a plan view, and a bottom surface of the shielding member is disposed so as to be parallel to the image recording surface Da and in proximity to the image recording surface Da. A function of the shielding members 6 is described in detail hereinafter.

Figure 6:
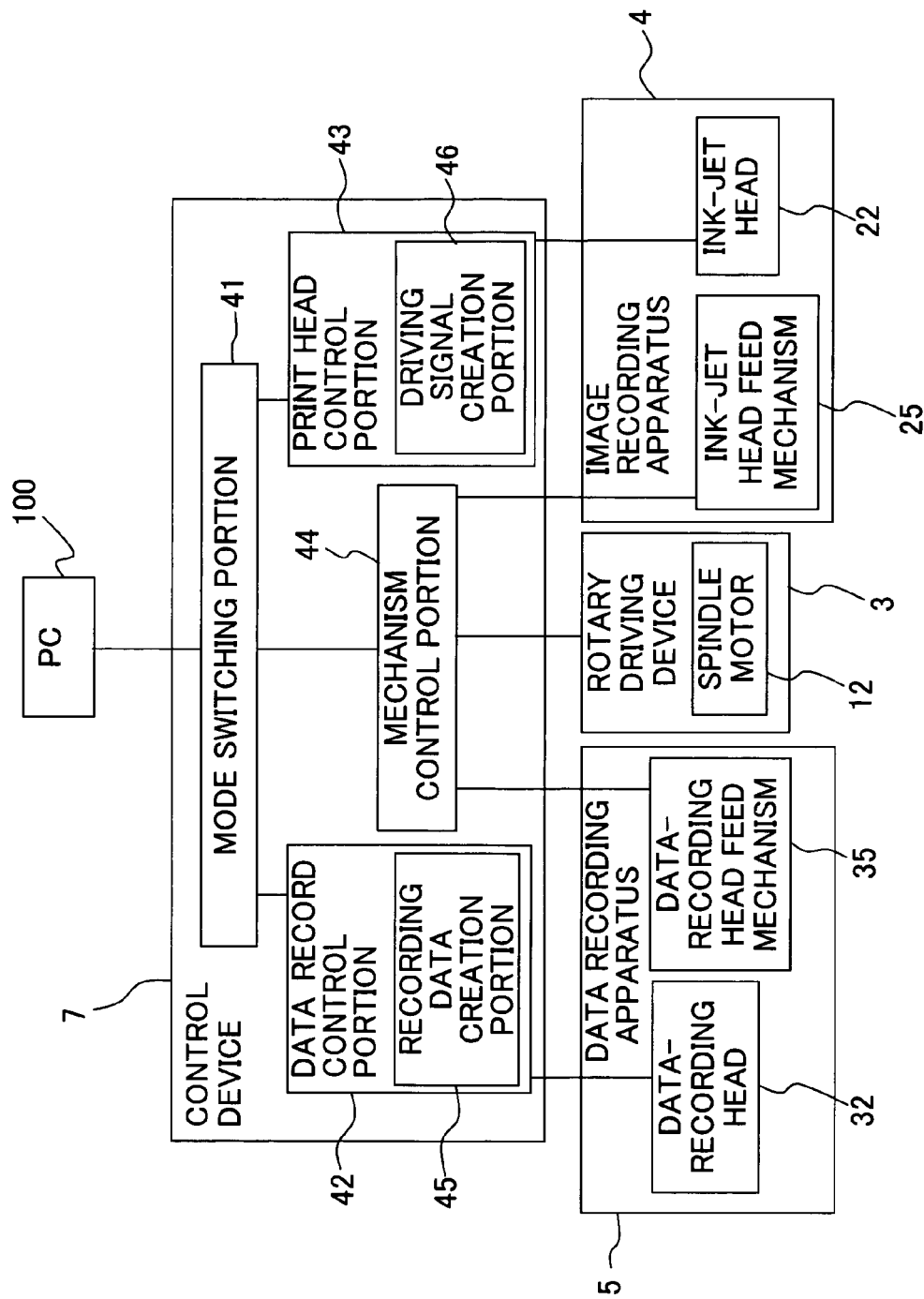
FIG. 6 is a block diagram showing an electrical configuration of the disk drive of FIG. 1.

Next, the control unit 7 is described with reference to FIG. 6. FIG. 6 is a block diagram showing an electrical configuration of the control unit 7. The control unit 7 controls each unit on the disk drive 1 in accordance with an instruction from a PC (Personal Computer) 100. The PC 100 is a device for creating and saving image data to be recorded on the image recording surface Da of the optical disk D and recording data to be recorded on the data recording surface Db, for transmitting the image data and recorded data to the control unit 7 and for instructing start of recording of an image and data. In addition, the control unit 7 includes a mode switching portion 41, a data record control portion 42, a print head control portion 43, and a mechanism control portion 44.

As shown in FIG. 6, the mode switching portion 41 is a portion for switching operation modes of the control unit 7, and switches among a data recording mode, image recording mode, and drying mode. The data recording mode is a mode for recording data by emitting a laser beam from the data-recording head 32 to the data recording surface Db of the optical disk D while rotating the optical disk D by means of the rotary driving unit 3. The image recording mode is a mode for recording an image by ejecting the ink from the ink-jet head 22 to the image recording surface Da of the optical disk D while rotating the optical disk D with the rotary driving unit 3. The drying mode is a mode for drying the ink which is ejected onto the image recording surface Da in the image recording mode, by rotating the optical disk D for a predetermined period of time by means of the rotary driving unit 3, after an image is recorded on the image recording surface Da of the optical disk D in the image recording mode. Operations performed by each unit in the data recording mode, image recording mode, and drying mode are described in detail hereinafter.

The data record control portion 42 is a portion for controlling the data-recording head 32 when recording data on the data recording surface Db of the optical disk D, and has a recording data creation portion 45. The recording data creation portion 45 performs modulation on the recorded data transmitted from the PC 100 and applies an error correction code, and, in accordance with the type of the optical disk (CD-R, CD-RW or the like), creates data corresponding to the format of the optical disk D. Then, the data record control portion 42 controls the timing at which the laser beam is emitted from the data-recording head 32 to the data recording surface Db of the optical disk D, and emitting time on the basis of the data created by the recording data creation portion 45.

The print head control portion 43 is a portion for controlling the ink-jet head 22, and has a driving signal creation portion 46. The driving signal creation portion 46 creates a driving voltage signal applied to an unshown actuator of the ink-jet head 22, on the basis of image data to be recorded on the image recording surface Da of the optical disk D. Then, the print head control portion 43 controls the ink-jet head 22 on the basis of the created driving voltage signal.

The mechanism control portion 44 controls each mechanism of the disk drive 1, and performs control of the rotation speed of the spindle motor 12 of the rotary driving unit 3, and performs control of an ink-jet head feed mechanism 25 which moves the carriage 21 of the image recording apparatus 4 when recording an image, and a data-recording head feed mechanism 35 which moves the carriage 31 of the data recording apparatus 5 when recording data.

Figure 7:
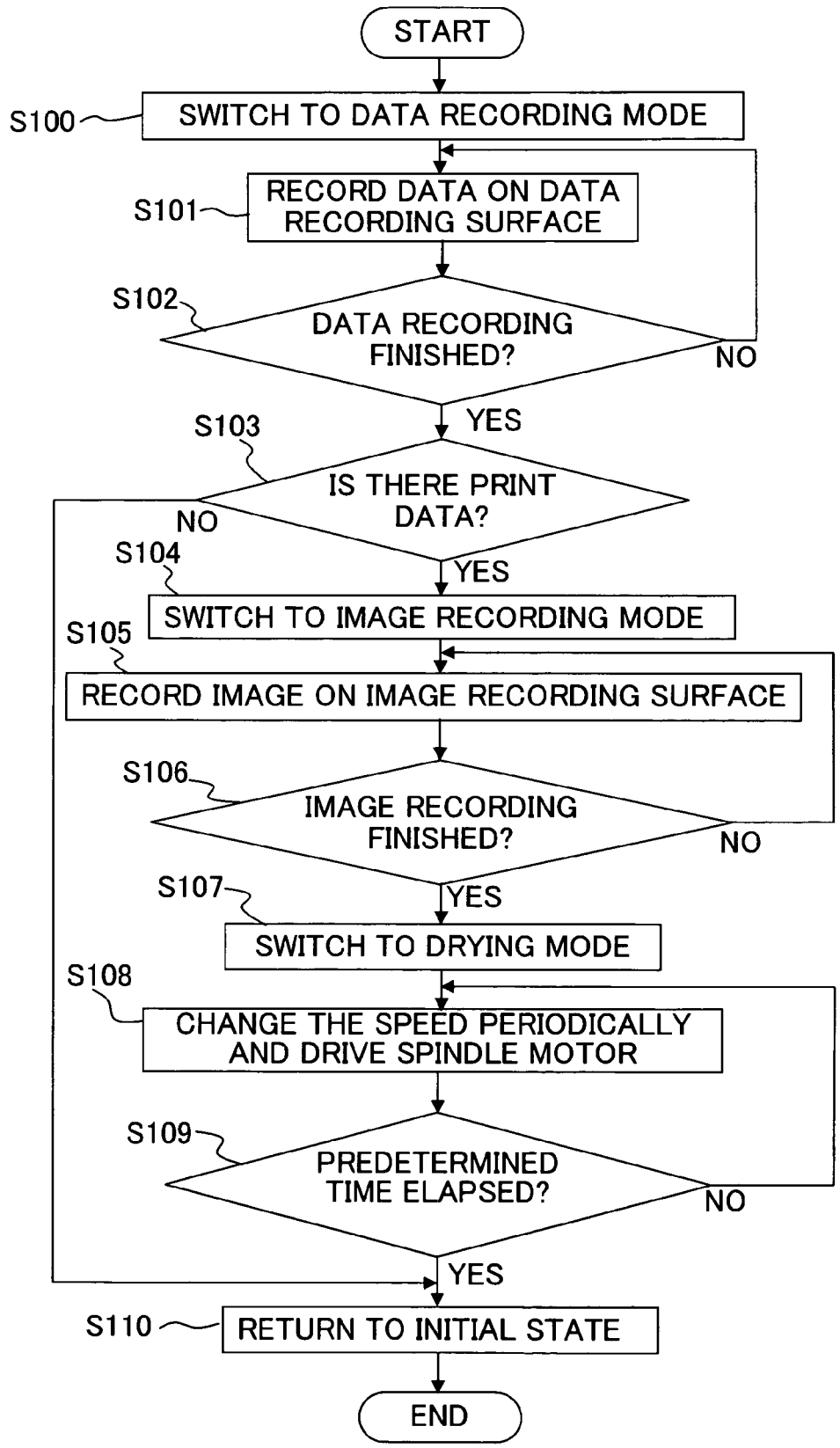
FIG. 7 is a flowchart showing an operation of the disk drive of FIG. 1.
Figure 8:
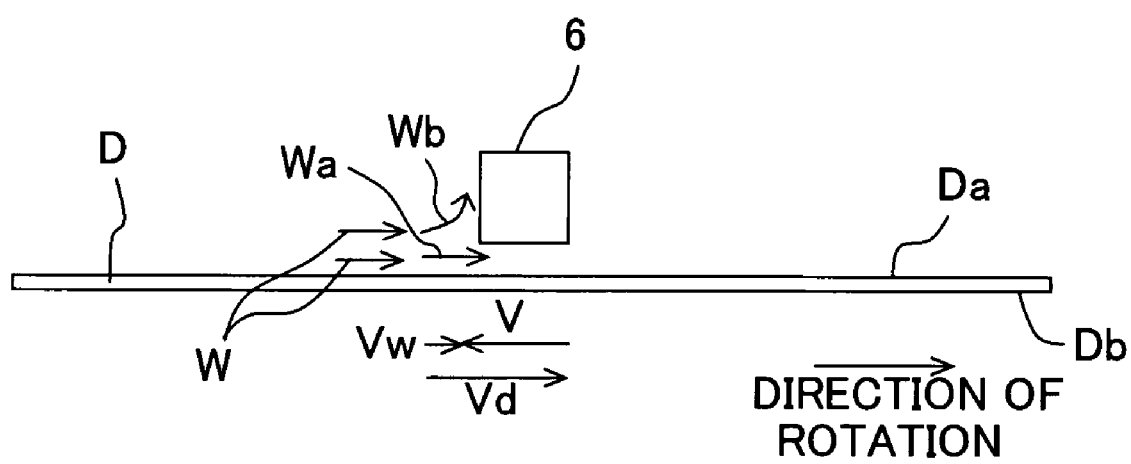
FIG. 8 is a flowchart equivalent to FIG. 7 in a second embodiment.

Next, a procedure for recording data and recording an image on the optical disk D in the disk drive 1 is described with reference to the flowchart of FIG. 7 and FIG. 8. FIG. 8 is a side view showing an enlarged vicinity of the shielding member 6 shown in FIG. 5. When recording data to be recorded on the data recording surface Db of the optical disk D is input from the PC 100 to the control unit 7, the mode switching portion 41 switches the disk drive 1 to the data recording mode (step S100: referred to as S100 hereinafter. Same in other steps). It should be noted that in this step when there exists image data to be recorded on the image recording surface Da of the optical disk D, this image data is input to the control unit 7 along with the recorded data. When the disk drive is switched to the data recording mode, the data record control portion 42 creates data corresponding to the format of the optical disk D by means of the recording data creation portion 45 on the basis of the data input from the PC 100. The mechanism control portion 44 moves the carriage 31, and moves the data-recording head 32 from the save position to the position where the carriage 31 overlaps the data recording surface Db in a plan view.

Then, data is recorded on the data recording surface Db of the optical disk D (S101). When recording data on the data recording surface Db, the mechanism control portion 44 controls the rotation speed of the spindle motor 12 so as to rotate the optical disk D at a predetermined speed of, for example, 4000 rpm. At the same time, the data record control portion 42 controls timing for emitting a laser beam and emitting time, on the basis of the data created by the recording data creation portion 45, and causes the laser output surface 34 of the data-recording head 32 to emit a laser beam onto the data recording surface Db of the optical disk D to record data on the data recording surface Db. In this step, the mechanism control portion 44 further controls the data-recording head feed mechanism 35 in accordance with the timing for emitting the laser beam and the emitting time to move the carriage 31 along the guide axes 33.

The above operations are repeated until recording of all data to be recorded is finished (S102: No). Then, when recording of all data to be recorded is finished (S102: Yes), in a case that image data to be recorded on the image recording surface Da of the optical disk D is not input from the PC 100 (S103: No), an image is not recorded on the image recording surface Da, thus the rotation of the spindle motor 12 is stopped, the carriage 31 is returned to the save position, each unit is returned to the initial state (S110), and the operation is finished. On the other hand, in the case that the image data is input (S103: Yes), the mode switching portion 41 switches the operation mode from the data recording mode to the image recording mode (S104). When the operation mode is switched to the image recording mode, the mechanism control portion 44 moves the carriage 21 having the ink-jet head 22 along the guide axes 23, moves the ink-jet head 22 to a position so as to face the image recording surface Da of the optical disk D, and at the same time moves the carriage 31 having the data-recording head 32 to return the data recording apparatus 5 to the save position. The print head control portion 43 creates a driving signal for driving the ink-jet head 22, by means of the driving signal creation portion 46 on the basis of the input image data. In addition to this operation, each unit performs preparation required for recording an image.

Then, the mechanism control portion 44 controls the rotation speed of the spindle motor 12 so as to rotate the optical disk D at a predetermined speed of, for example, 200 rpm, and at the same time the print head control portion 43 causes the ink-jet head 22 to eject inks on the basis of the driving signal created by the driving signal creation portion 46, to record (print) an image on the image recording surface Da of the optical disk D (S105). In this step, the mechanism control portion 44 controls the ink-jet head feed mechanism 25 in accordance with ink ejection timing to move the carriage 21 along the guide axes 23.

The above operation is continued until recording of an image onto the image recording surface Da is finished (S106: No). When recording of an image is finished (S106: Yes), the mode switching portion 41 switches the operation mode from the image recording mode to the drying mode (S107). When the operation mode is switched to the drying mode, the mechanism control portion 44 sets the rotation speed of the spindle motor 12 to a rotation speed faster than the rotation speed in the data recording mode. In addition to this operation, each unit performs preparation for drying the ink on the image recording surface Da of the optical disk D.

Next, the mechanism control portion 44 controls the rotation speed to rotate the spindle motor 12 of the rotary driving unit 3 and rotates the optical disk D (S108). In the drying mode, the mechanism control portion 44 periodically changes the rotation speed of the optical disk D, and rotates the spindle motor 12 such that the rotation speed of the optical disk D is faster than the rotation speed of the optical disk D in the image recording mode. For example, the rotation speed is controlled such that the rotation speed is repeatedly switched between 200 rpm and 6000 rpm in a period of approximately three seconds.

When the optical disk D is rotated, as shown in FIG. 8, there is generated airflow W which follows the optical disk D due to the viscosity of the air in the vicinity of the surface of the disk, and moves along the image recording surface Da in the direction of rotation of the optical disk D. The speed of the airflow W becomes faster toward the vicinity of the image recording surface Da. In a virtual case in which the airflow W is not generated, relative speed V of the air to the rotating optical disk D becomes the speed of the direction opposite to the direction of rotation of the optical disk D and same as rotation speed Vd of the optical disk D (V=Vd). However, when the airflow W is generated, as shown in FIG. 8, the relative speed V of the air to the rotating optical disk D becomes the speed of the direction opposite to the direction of rotation of the optical disk D and becomes smaller by the speed Vw of the generated airflow W (V=Vd−Vw).

In the present embodiment, however, as shown in FIG. 8, the airflow W hits the shielding member 6, and some of the airflow W (airflow Wb) flows to the upside and to the inside and outside in the radial direction of the optical disk D along the shielding member 6, while the rest of the airflow W (airflow Wa) flows into between the shielding member 6 and the image recording surface Da of the optical disk D. In this case, speed Vwa of the airflow Wa flowing into between the shielding member 6 and the image recording surface Da becomes lower than the speed Vw of the airflow W before the airflow W hits the shielding member 6 (Vw>Vwa). Therefore, after the airflow W hits the shielding member 6, the relative speed of the air to the optical disk D on the image recording surface Da becomes larger by the reduced speed of the airflow (V=Vd−Vwa). Accordingly, the relative speed of the air to the optical disk D increases in a region on the image recording surface Da of the optical disk D which faces the shielding member, and in a region which is close to the region facing the shielding member and disposed in the downstream side in the direction of rotation of the optical disk D, whereby drying of the ink can be accelerated.

In addition, when the rotation speed Vd of the optical disk D is changed periodically, the air in the vicinity of the image recording surface Da of the optical disk D follows the change of the rotation speed of the optical disk D due to the viscosity of the air, whereby the speed of the airflow also changes, thus the airflow W moving in the direction of rotation of the optical disk D along the image recording surface Da is disturbed. Due to this disturbance, the speed Vw of the airflow W is reduced, thus the relative speed of the air to the optical disk D on the image recording surface Da increases. Accordingly, drying of the ink adhered to the image recording surface Da of the optical disk D is further accelerated.

Furthermore, in the drying mode, since the optical disk D is rotated at the rotation speed Vd which is faster than the rotation speed of the optical disk D in the image recording mode, the relative speed V of the air to the optical disk D on the image recording surface Da becomes faster than the relative speed of the air in the image recording mode. Therefore, drying of the ink adhered to the image recording surface Da is further accelerated.

Rotation of the spindle motor 12 continues until a predetermined time elapses (S109: No). When the predetermined time has elapsed (S109: Yes), the mechanism control portion 44 stops the rotation of the spindle motor 12, moves the carriage 21 having the ink-jet head 22 to the save position, and returns each unit to the initial state (S110), whereby the operation is finished. In this case, since the ink on the image recording surface Da of the optical disk D is dried, the optical disk D can be removed from the disk drive 1.

According to the embodiment described above, after an image is recorded on the image recording surface Da of the optical disk D in the image recording mode, the optical disk D is rotated by the spindle motor 12 in the drying mode, whereby the ink adhered to the image recording surface Da is dried. Therefore, compared to the case in which the optical disk is in a stationary state after an image is recorded, the relative speed V of the air to the optical disk D on the image recording surface Da becomes larger, thus drying of the ink adhered to the image recording surface Da can be accelerated.

In the drying mode, the mechanism control portion 44 controls the rotary driving unit 3 such that the rotation speed Vd of the spindle motor 12 is always faster than the rotation speed of the spindle motor 12 in the image recording mode, thus the relative speed V of the air to the optical disk D on the image recording surface Da becomes larger than when recording an image, whereby drying of the ink adhered to the image recording surface Da is further accelerated.

Further, in the drying mode, since the mechanism control portion 44 controls the rotary driving unit 3 such that the rotation speed of the spindle motor 12 is changed periodically, thus the airflow on the image recording surface Da generated by the rotation of the optical disk D is disturbed, whereby the speed of the airflow decreases, thus the relative speed of the air to the optical disk D on the image recording surface Da increases. Therefore, drying of the ink adhered to the image recording surface Da is further accelerated.

In addition, since the shielding members 6 extending in the radial direction of the optical disk D are disposed on the upper side of the image recording surface Da of the optical disk D, in the drying mode, the airflow W generated by rotating the optical disk D is disturbed by the shielding members 6, whereby the speed of the airflow decreases. Therefore, the relative speed of the air to the optical disk D increases in the region on the image recording surface Da which faces the shielding member 6, and in the region which is close to the region facing the shielding member and disposed in the downstream side in the direction of rotation of the optical disk D. Accordingly, drying of the ink adhered to the image recording surface Da is further accelerated.

Also by rotating the optical disk D when recording an image on the image recording surface Da of the optical disk D, the airflow is generated in the vicinity of the image recording surface Da due to the viscosity of the air. However, since the airflow is disturbed by the shielding member 6, the relative speed of the air to the optical disk D increases in the region on the image recording surface Da which faces the shielding member 6, and in the region which is close to the region facing the shielding member and disposed in the downstream side of the direction of rotation of the optical disk D. Therefore, during recording an image on the image recording surface Da as well (during the image recording mode), drying of the ink in the above regions is accelerated. Moreover, as shown in FIG. 2, one of the shielding members 6 is disposed in a position obtained by rotating the optical disk D from the position of the ink-jet head 22 (the image recording apparatus 4) by 90 degrees in a direction opposite to the direction of rotation of the optical disk D, in other words in the upstream side of the of the direction of rotation of the optical disk D, thus the airflow in the vicinity of the image recording surface Da is distorted by this shielding member 6 in the upstream side of the ink-jet head 22, and the airflow flowing into between the ink ejection surface 26 and the image recording surface Da is decreased. Accordingly, it is possible to prevent as much as possible the ink ejected from the nozzles 27 of the ink-jet head 22 from being flowed by the airflow, and thereby shifting a landing position of the ink. It should be noted that the upstream side of the direction of rotation of the optical disk D of the ink-jet head 22 means a region in which the rotation angle obtained by rotating the optical disk D in the direction opposite to the direction of rotation from the ink-jet head 22, is 180° or less, i.e., a region corresponding to the left half of the optical disk D of FIG. 4 in a plan view.

Furthermore, in the disk drive 1, the data recording apparatus 5 is disposed in the lower side of the data recording surface Db which is the side opposite to the image recording surface Da in which the image recording apparatus 4 is disposed, thus one apparatus can perform image recording onto the image recording surface Da and data recording onto the data recording surface Db. Moreover, the image recording apparatus 4 and the data recording apparatus 5 are disposed so as to be diagonally opposite to each other (symmetric about a point) with respect to the rotational center of the optical disk D, thus inks ejected from the ink-jet head 22 are hardly adhered to the data-recording head 32. Accordingly, the data-recording head 32 hardly breaks down.

Second Embodiment

The second embodiment is described next. The second embodiment is different from the first embodiment in that the operation mode is not switched to the drying mode to dry the ink after recording an image on the image recording surface of the optical disk in the image recording mode.

Figure 9:
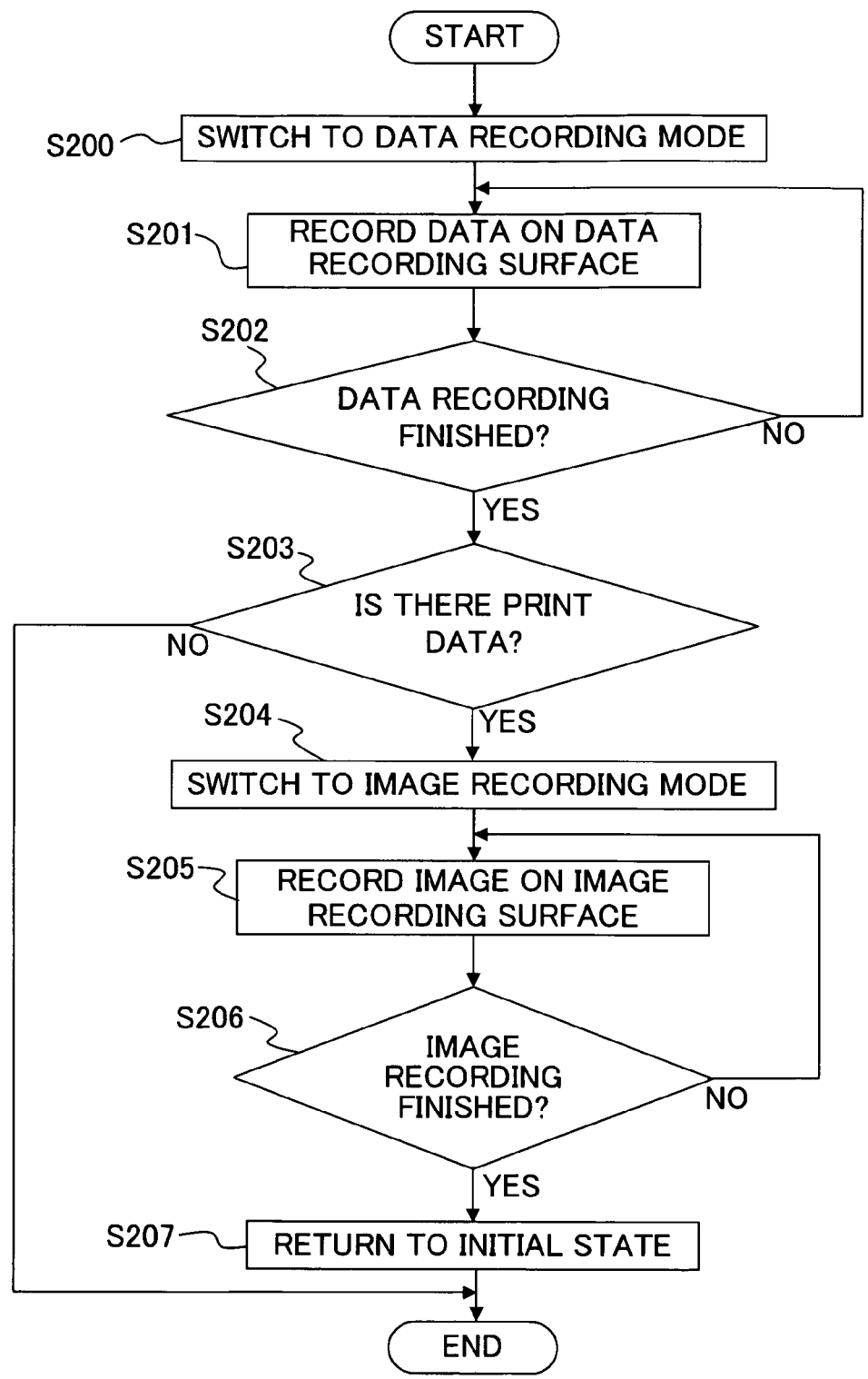
FIG. 9 is an enlarged view showing the vicinity of the shielding member of FIG. 5.

FIG. 9 is a flowchart showing a process of the disk drive 1 when recording data and recording an image in the present embodiment. In the present embodiment, as in the case of the first embodiment, when the recording data to be recorded on the data recording surface Db of the optical disk D is input from the PC 100 to the disk drive 1, the mode switching portion 41 switches the operation mode of the disk drive 1 to the data recording mode (S200), and prepares for data recording. It should be noted that when there exists image data to be recorded on the image recording surface Da of the optical disk D in this step, this image data is also input to the disk drive 1 along with the recorded data.

Next, the mechanism control portion 44 rotates the optical disk D by rotating the spindle motor 12 at a predetermined rotation speed of, for example, approximately 4000 rpm. Then, the data record control portion 42 controls the timing for emitting a laser beam and the emitting time on the basis of the data created by the recording data creation portion 45, and causes the laser output surface 34 of the data-recording head 32 to emit a laser beam onto the data recording surface Db of the optical disk D, whereby the data is recorded on the data recording surface Db (S201). In this step, the mechanism control portion 44 controls the data-recording head feed mechanism 35 in accordance with the timing for emitting the laser beam and the emitting time, and moves the carriage 31 having the data-recording head 32 along the guide axes 33.

The above operations are repeated until recording of all data to be recorded is finished (S202: No). Then, when recording of all data to be recorded is finished (S202: Yes), in the case that image data to be recorded on the image recording surface Da of the optical disk D is not input from the PC 100 (S203: No), an image is not recorded on the image recording surface Da, thus the carriage 31 is returned to the save position, each unit is returned to the initial state (S207), and the operation is finished. On the other hand, in the case that the image data is input (S203: Yes), the mode switching portion 41 switches the operation mode from the data recording mode to the image recording mode (S204), and each unit performs preparation required for recording an image.

Next, the mechanism control portion 44 rotates the optical disk D by rotating the spindle motor 12 at a predetermined speed of, for example, 200 rpm, and at the same time the print head control portion 43 causes the ink-jet head 22 to eject inks from the nozzles 27 thereof on the basis of the driving signal created by the driving signal creation portion 46, to record (print) an image on the image recording surface Da of the optical disk D (S205). In this step, the mechanism control portion 44 controls the ink-jet head feed mechanism 25 in accordance with ink ejection timing to move the carriage 21 along the guide axes 23.

In this step, as in the case of the first embodiment, when the optical disk D is rotated, there is generated the airflow which follows the rotation of the optical disk D due to the viscosity of the air in the vicinity of the image recording surface Da, and moves along the image recording surface Da in the direction of rotation of the optical disk D, thus the relative speed of the air to the optical disk D on the image recording surface Da is reduced as much as the speed of the generated airflow.

However, in the present embodiment as well, the airflow generated in the vicinity of the image recording surface Da hits the shielding member 6, and some of the airflow flows to the upside and to the inside and outside in the radial direction of the optical disk D along the shielding member 6, while the rest of the airflow flows into between the shielding member 6 and the image recording surface Da. In this case, the speed of the airflow is lower, compared to before the airflow hits the shielding member 6, thus the relative speed of the air to the optical disk D on the image recording surface Da becomes larger by the reduced speed of this airflow. Accordingly, the relative speed of the air to the optical disk D increases in a region on the image recording surface Da which faces the shielding member, and in a region which is close to the region facing the shielding member and disposed in the downstream side in the direction of rotation of the optical disk D, whereby drying of the ink is accelerated.

Moreover, as shown in FIG. 2, one of the shielding members 6 is disposed in a position obtained by rotating the optical disk D from the position of the ink-jet head 22 (the image recording apparatus 4) by 90 degrees in a direction opposite to the direction of rotation of the optical disk D, in other words in the upstream side of the of the direction of rotation of the optical disk D, thus the airflow in the vicinity of the image recording surface Da is disturbed by this shielding member 6 in the upstream side of the ink-jet head 22, and the airflow flowing into between the ink ejection surface 26 and the image recording surface Da is decreased. Accordingly, it is possible to prevent as much as possible the ink ejected from the nozzles 27 of the ink-jet head 22 from being flowed by the airflow, and thereby shifting a landing position of the ink.

The above operation is continued until recording of an image onto the image recording surface Da is finished (S206: No), and when recording of an image is finished (S206: Yes), the carriage 21 having the ink-jet head 22 is returned to the save position, each unit is returned to the initial state (S207), and the operation is finished.

In addition, in the disk drive 1 (recording apparatus) of the first and second embodiments, the number of ejection times from the nozzles can be adjusted in accordance with the position of the radius of the ink-jet head 22, in order to equalize the color density of an image to be recorded on the image recording surface of the optical disk D. Accordingly, the landing amount of the ink per unit area on the image recording surface of the optical disk D can be made constant to equalize the color density. Specifically, the number of ejection times is reduced for the nozzles located toward the inner peripheral side of the optical disk D (the number of ejection times are thinned out). When simultaneously ejecting ink droplets having different volumes to perform gradation of the droplets, the size of each of the droplets may be adjusted so that the landing amount of ink per unit area on the image recording surface becomes constant.

The disk drive 1 of the first and second embodiments can be applied to a case in which the rotation speed (angular speed) of the optical disk is kept constant to record an image (a case in which the optical disk is subjected to CAV control), or a case in which the rotation speed of the optical disk is changed in accordance with the position of the radius of the ink-jet head and the linear speed is made constant, to record an image (a case in which the optical disk is subjected to CLV control).

MODIFIED EXAMPLES

Next, modified examples in which various modifications are applied to the first and second embodiments are described. It should be noted that same reference numerals are used to indicate the portions or parts having the same configurations as these of the first and second embodiments, thus the explanations for these portions or parts are omitted as appropriate.

Figure 10:
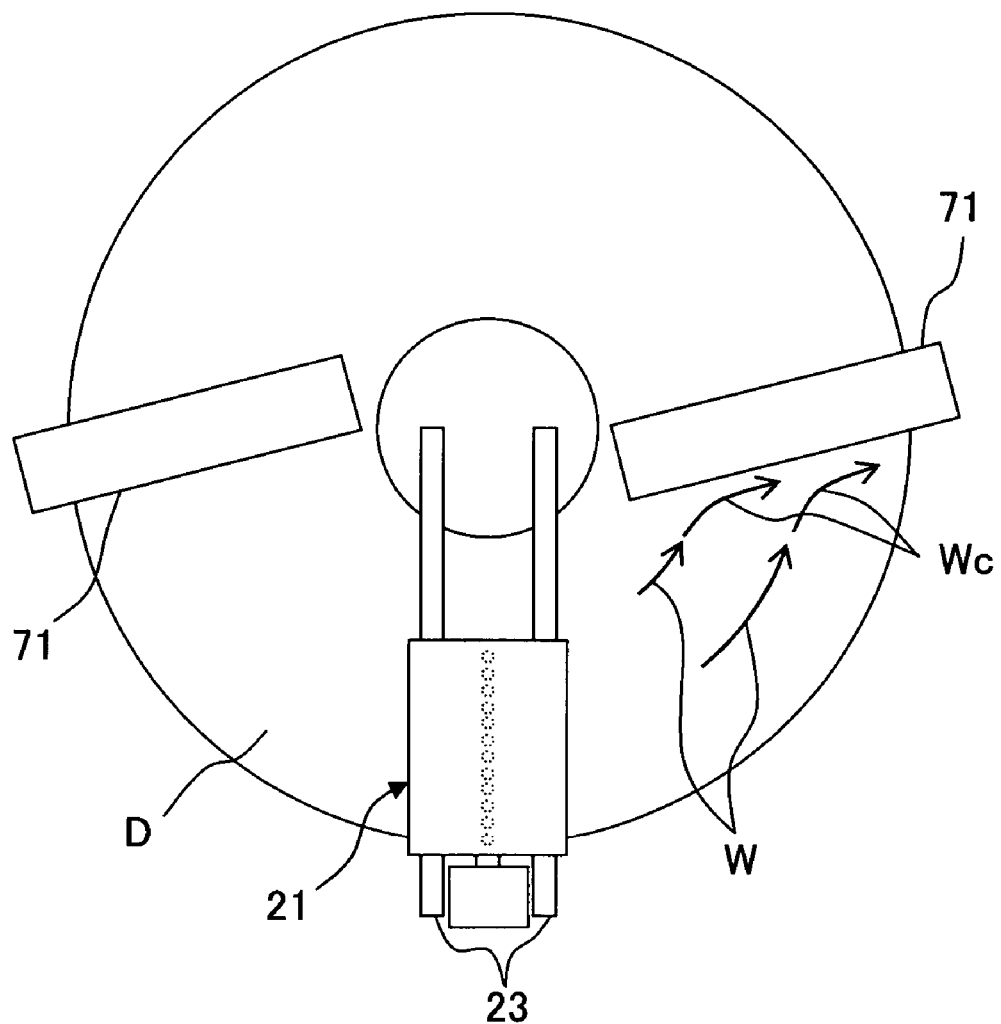
FIG. 10 is a plan view equivalent to FIG. 4 in modified example 1.

As shown in FIG. 10, a shielding member 71 may be inclined to a direction perpendicular to the direction of rotation of the optical disk D as viewed from direction perpendicular to the image recording surface of the optical disk (modified example 1). Specifically, the shielding member 71 may be inclined with respect to the radial direction of the optical disk D, such that an outer end portion of the shielding member 71 advances in the direction of rotation of the optical disk D. In this case, as shown in FIG. 10, some of the airflow W generated by rotating the optical disk D (airflow Wc) flows in a direction toward the outside from the rotational center of the optical disk D along the inclined side surface of the shielding member 71, thus the speed of the airflow flowing into between the shielding member 71 and the image recording surface Da can be reduced. Furthermore, the shielding member 71 may be inclined with respect to the radial direction of the optical disk D, such that an inner end portion of the shielding member 71 advances in the direction of rotation of the optical disk D. In this case, by allowing the airflow to flow in a direction of approaching the rotational center of the optical disk D, the speed of the airflow flowing into between the shielding member 71 and the image recording surface Da can be reduced. Accordingly, the relative speed of the air to the optical disk D further increases in the region on the image recording surface Da which faces the shielding member 71, and in a region which is close to the region facing the shielding member 71 and disposed in the downstream side in the direction of rotation of the optical disk D, thus drying of the ink on the image recording surface Da can be further accelerated.

Figure 11:
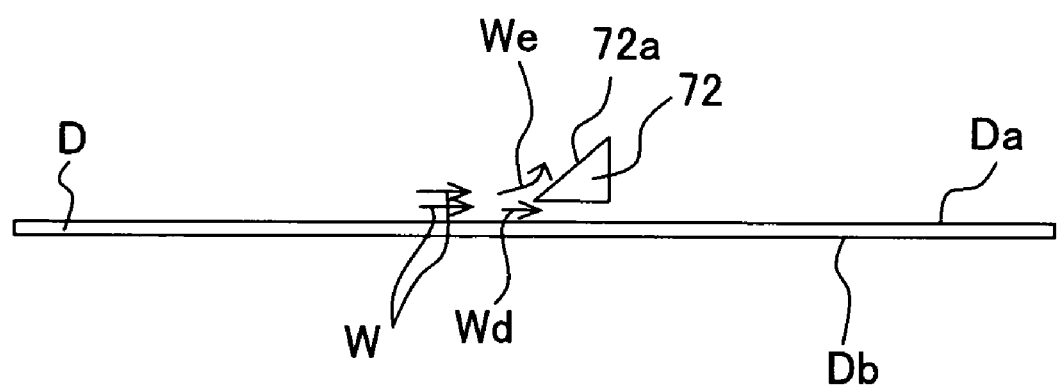
FIG. 11 is a side view equivalent to FIG. 6 in modified example 2.

As shown in FIG. 11, a surface 72a of a shielding member 72, which is on the side opposite to the surface facing the image recording surface Da of the optical disk D, may be inclined (modified example 2). In the case of FIG. 11, the inclined surface 72a is inclined so as to be proximate to the image recording surface Da at an end portion on an upstream side in the direction of rotation of the inclined surface 72a, and so as to separate from the image recording surface Da toward a downstream side in the direction of rotation of the inclined surface 72a. In this case, as shown in FIG. 11, some of the airflow generated when rotating the optical disk D (airflow We) flows upward along the inclined surface 72a, thus the speed of airflow Wd flowing into between the shielding member 72 and the image recording surface Da can be reduced. Accordingly, the relative speed of the air to the optical disk D further increases in the region on the image recording surface Da which faces the shielding member 72, and in a region which is close to the region facing the shielding member 72 and disposed in the downstream side in the direction of rotation of the optical disk D, thus drying of the ink on the image recording surface Da can be further accelerated.

Figure 12:
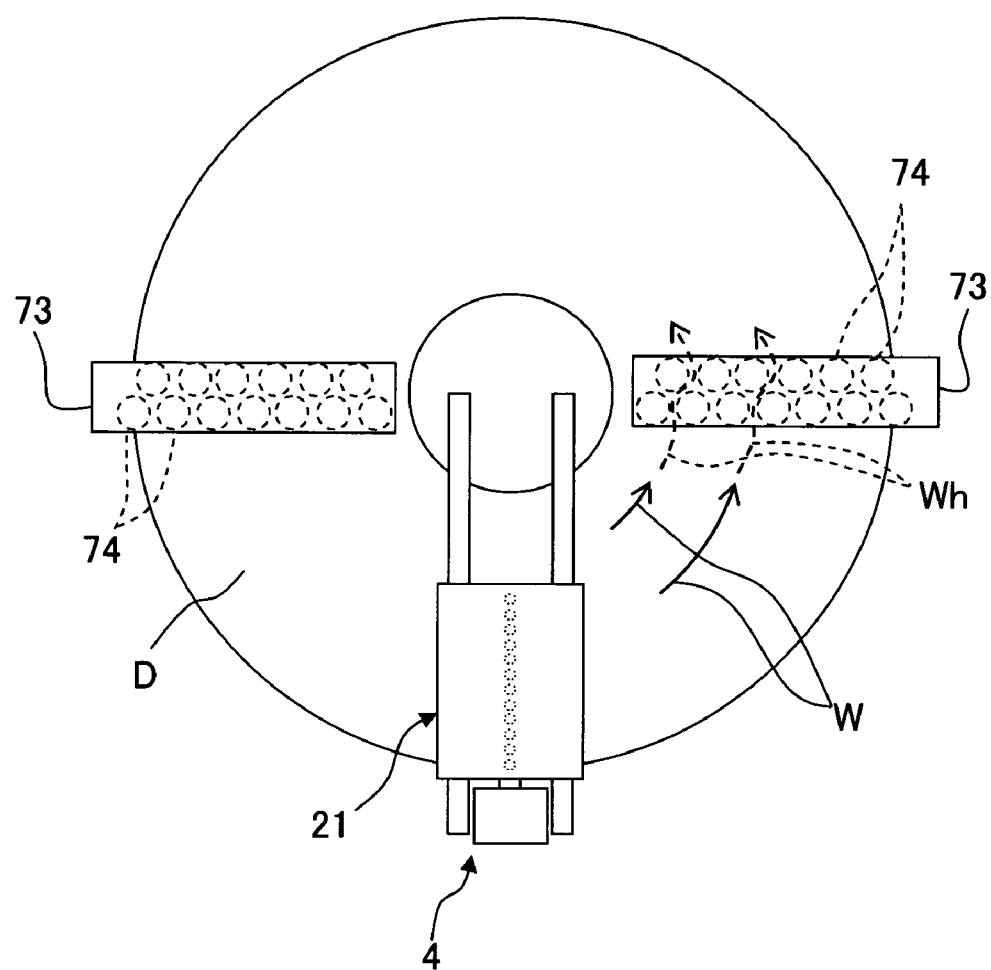
FIG. 12 is a plan view equivalent to FIG. 4 in modified example 3.
Figure 13:
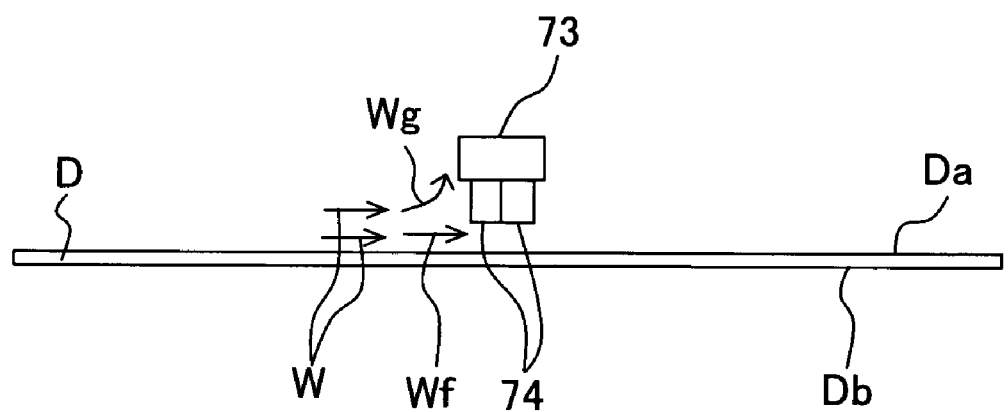
FIG. 13 is a side view equivalent to FIG. 6 in modified example 3.

As shown in FIG. 12 and FIG. 13, a shielding member 73 may have a plurality of shielding column portions 74 extending toward the image recording surface Da of the optical disk Da and in a direction perpendicular to the image recording surface Da (modified example 3). Specifically, as shown in FIG. 12 and FIG. 13, a plurality of cylindrical shielding column portions 74 extending vertically from a bottom surface of the shielding member 73 toward the image recording surface Da may be formed. In this case, as shown in FIG. 12 and FIG. 13, the shielding column portions 74 block the movement of the airflow generated when rotating the optical disk D, and some of the airflow flows toward an upside of the shielding member 73 (airflow Wg) or passes through the shielding column members 74 (airflow Wh). As a result, the speed of the airflow Wf flowing into between the shielding member 73 and the image recording surface Da can be reduced. Accordingly, the relative speed of the air to the optical disk D further increases in the region on the image recording surface Da which faces the shielding member 73, and in a region which is close to the region facing the shielding member 73 and disposed in the downstream side in the direction of rotation of the optical disk D, thus drying of the ink on the image recording surface Da can be further accelerated.

Figure 14:
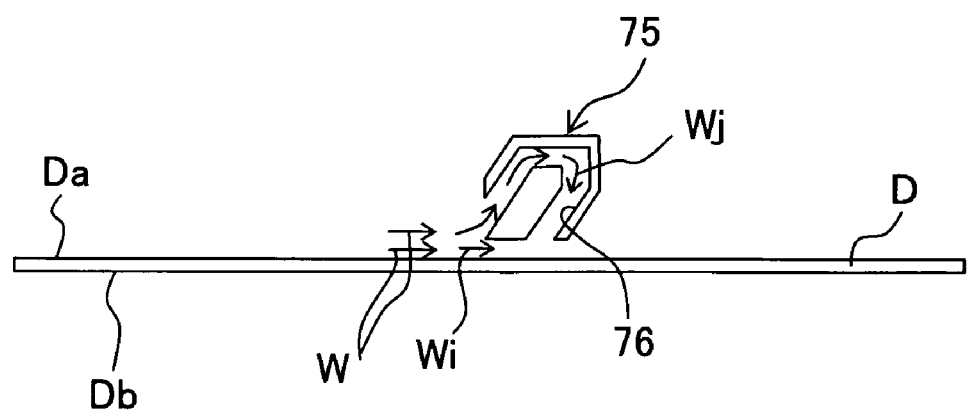
FIG. 14 is a side view equivalent to FIG. 6 in modified example 4.

As shown in FIG. 14, an airflow path 76, which returns the airflow flowing from the upstream side of the direction of rotation of the recording medium by rotating the recording medium, to the upstream side of the direction of rotation, may be formed inside a shielding member 75 (modified example 4). Specifically, as shown in FIG. 14, there may be formed the airflow path 76 which, first, extends obliquely upward from an end portion of the shielding member 75 on the upstream side of the direction of rotation of the optical disk D toward the downstream side of the direction of rotation, then extends obliquely downward from the downstream side to the upstream side of the direction of rotation, and reaches a bottom surface of the shielding member 75. In this case, as shown in FIG. 14, some of the airflow generated with the rotation of the optical disk D (airflow Wj) flows into the airflow path 76 inside the shielding member 75, and the airflow Wj further flows into between the shielding member 75 and the image recording surface Da from the bottom surface of the shielding member 75. In this case, as shown in FIG. 14, the airflow Wj flows from the downstream to the upstream of the direction of rotation of the optical disk D, the speed of airflow Wi, which flows into between the shielding member 75 and the image recording surface Da without passing through the airflow path 76 inside the shielding member 75, can be reduced. Accordingly, the relative speed of the air to the optical disk D further increases in the region on the image recording surface Da which faces the shielding member 75, and in a region which is close to the region facing the shielding member 75 and disposed in the downstream side in the direction of rotation of the optical disk D, thus drying of the ink on the image recording surface Da can be further accelerated.

Figure 15:
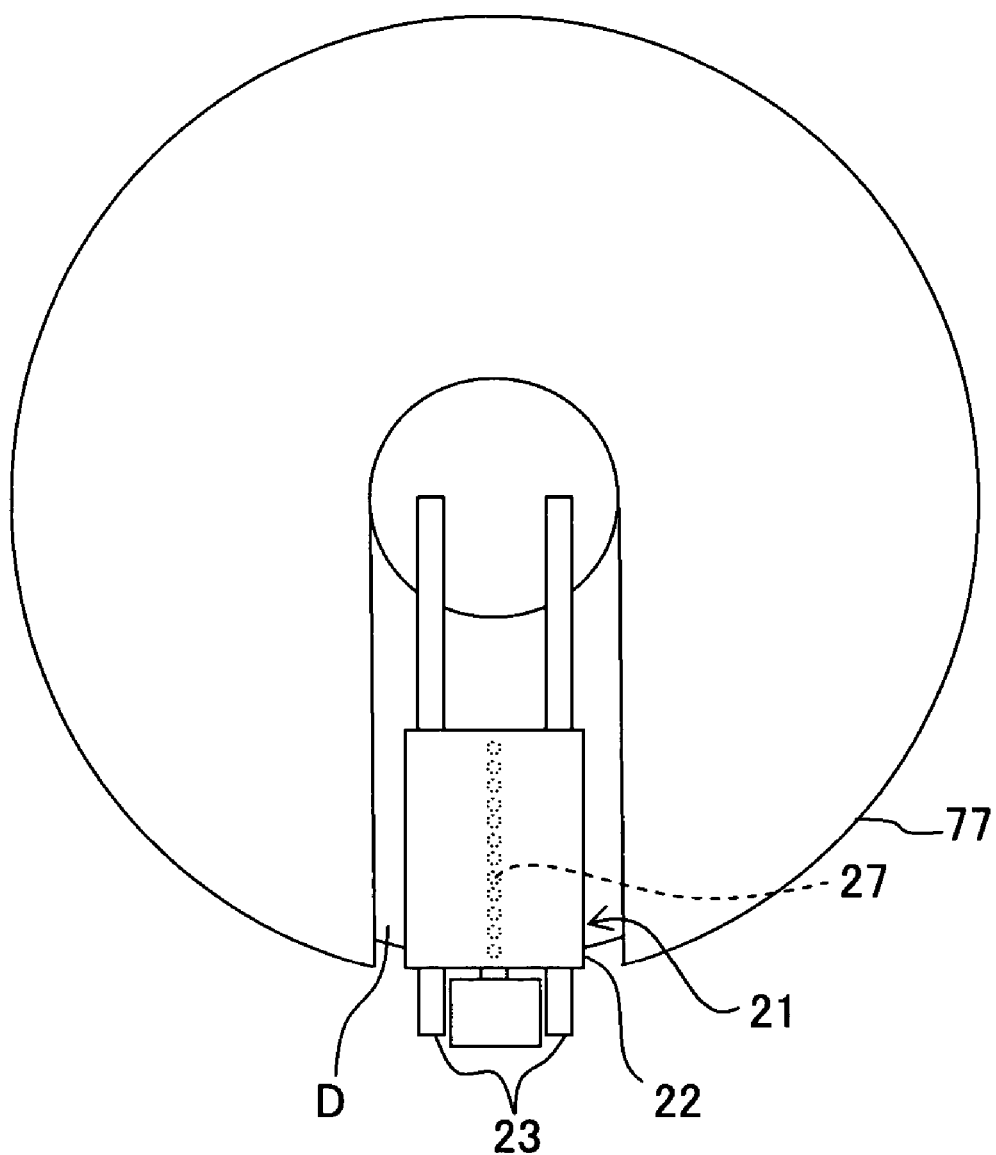
FIG. 15 is a plan view equivalent to FIG. 4 in modified example 5.

As shown in FIG. 15, there may be used a shielding member 77 having a configuration in which a bottom surface of the shielding member 77 (surface on the optical disk D side) faces the entire region of the image recording surface Da of the recording medium, excluding a region on the image recording surface Da which can be placed opposite to the ink-jet head 22 (modified example 5). Specifically, as shown in FIG. 15, a configuration may be possible in which, the entire surface region of the optical disk D excluding a region opposite to a range where the ink-jet head 22 can move along with the carriage 21 along the guide axes 23 is covered with the shielding member 77. In this case, the shielding member 77 prevents the air from flowing into between the shielding member 77 and the image recording surface Da in the region excluding a section where the ink-jet head 22 is disposed, and the speed of the airflow in the region facing the shielding member 77 is reduced. Further, the shielding member 77 is disposed in the vicinity of an upstream side of the ink-jet head 22, thus it is possible to suppress the inflow of airflow between the image recording surface Da and the ink ejection surface 26 of the ink-jet head 22. Accordingly, a landing position of ink can be prevented from being shifted at the time of image recording by the airflow generated with the rotation of the optical disk D.

Figure 16:
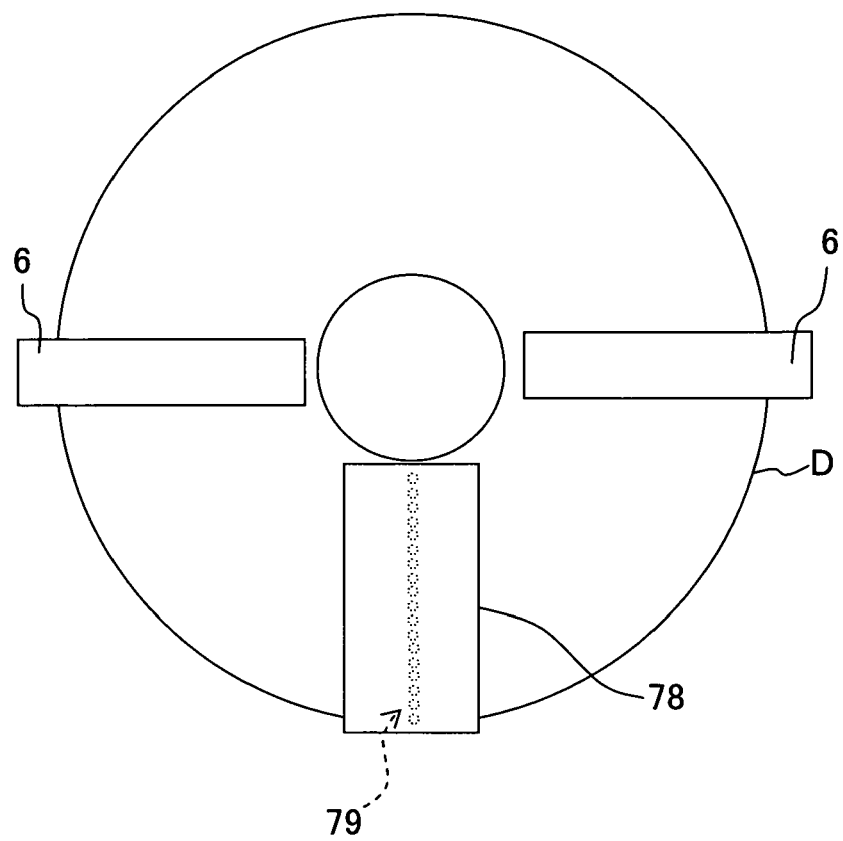
FIG. 16 is a plan view equivalent to FIG. 4 in modified example 6.

In the above description, the serial type ink-jet head has been described. However, the present invention is not limited to this. There may be used a line type ink-jet head in which a nozzle row 79 of the ink-jet head 78 extends over an area ranging from an inner end to an outer end of the image recording surface Da of the optical disk D, as shown in FIG. 16 (modified example 6).

In addition, in the present invention, the rotation speed of the optical disk D in the drying mode may be not only higher than the rotation speed of the optical disk D in the image recording mode, but also equal to or lower than the rotation speed of the optical disk D in the image recording mode. Further, in the present invention, the rotation speed of the optical disk D in the drying mode may not be changed periodically, thus the optical disk D may be rotated at constant speed, or the rotation speed may be changed randomly.

Moreover, in the present invention, the shielding members may not only be disposed in a region from the vicinity of the rotational center of the optical disk D to the outer peripheral portion, but also in a part of such region only. Alternatively no shielding member may be disposed.

In the above description, the apparatus for recording an image on the image recording surface Da of the optical disk D such as a CD-R or CD-RW has been described. However, the present invention is not limited to this. An image may be recorded on a recorded medium which does not have a data recording surface for recording data, or on a recorded medium in a shape other than a circle. In addition, there may be used an apparatus which is not provided with the data recording apparatus and only records an image.

What is claimed is:

1. A recording apparatus which records an image on a recording medium while rotating the recording medium, the recording apparatus comprising:
    a rotary driving unit which rotationally drives the recording medium;
    an ink-jet head for ejecting ink onto an image recording surface of the recording medium; and
    a control unit which switches between an image recording mode for ejecting the ink onto the image recording surface by the ink-jet head while rotating the recording medium by the rotary driving unit, and a drying mode for drying the ink ejected onto the image recording surface by rotating the recording medium for a predetermined period of time by the rotary driving unit after the image recording mode, wherein the control unit controls the rotary driving unit such that a rotation speed of the recording medium in the drying mode is different from a rotation speed of the recording medium in the image recording mode.

2. The recording apparatus according to claim 1, wherein the control unit controls the rotary driving unit such that a rotation speed of the recording medium in the drying mode is faster than a rotation speed of the recording medium in the image recording mode.

3. The recording apparatus according to claim 1, wherein the control unit controls the rotary driving unit such that a rotation speed of the recording medium in the drying mode is changed periodically.

4. The recording apparatus according to claim 1, farther comprising a shielding member which is disposed, in proximity to the image recording surface, over an area ranging from the vicinity of a center of rotation of the recording medium to an outer peripheral portion of the recording medium.

5. The recording apparatus according to claim 4, wherein the shielding member is disposed on an upper stream side of the ink-jet head, in the direction of rotation of the recording medium.

6. The recording apparatus according to claim 4, wherein the shielding member is inclined to a direction perpendicular to a direction of rotation of the recording medium, as viewed from a direction perpendicular to the image recording surface.

7. The recording apparatus according to claim 4, wherein the shielding member has an inclined surface, and a distance between the inclined surface and the image recording surface becomes larger toward a downstream in a direction of rotation of the recording medium.

8. The recording apparatus according to claim 4, wherein the shielding member has a plurality of shielding column portions extending in a direction perpendicular to the image recording surface toward the image recording surface.

9. The recording apparatus according to claim 4, wherein an inside of the shielding member is formed with an airflow path which returns an airflow, flowing along the recording medium from an upstream side in a direction of rotation of the recording medium, to the upstream side in the direction of rotation.

10. The recording apparatus according to claim 4, wherein the shielding member is disposed so as to face an entire region of the image recording surface of the recording medium, excluding a region on the image recording surface of the recording medium which is placed opposite to the ink-jet head.

11. The recording apparatus according to claim 1, further comprising a data-recording head which records data on a data recording surface formed on a side of the recording medium, the side being opposite to the image recording surface of the recording medium, wherein
    the ink-jet head and the data-recording head are disposed so as to be opposite to each other with the recording medium intervening therebetween.

12. A recording apparatus which records an image on a rotating recording medium while rotating the recording medium, the recording apparatus comprising:

a rotary driving unit which rotationally drives the recording medium;

an ink-jet head which ejects ink onto an image recording surface of the recording medium; and a shielding member which is disposed in proximity to the image recording surface over an area ranging from the vicinity of a center of rotation of the recording medium to an outer peripheral portion of the recording medium, wherein the shielding member is disposed on an upper stream side of the ink-jet head, in the direction of rotation of the recording medium.

13. A method of recording an image on a recording medium having a data recording surface on which data is recorded and an image recording surface on which an image is recorded with a recording apparatus having a data-recording head and an ink-jet head, the method comprising the steps of:

recording data on the data recording surface with the data-recording head while rotating the recording medium;

recording an image on the image recording surface with the ink-jet head while rotating the recording medium; and drying the image recorded on the image recording surface by rotating the recording medium, wherein a rotation speed of the recording medium when recording an image on the image recording surface is different from the rotation speed of the recording medium when drying the image recorded on the image recording surface.

14. The recording method according to claim 13, wherein the rotation speed of the recording medium when drying the image recorded on the image recording surface is faster than the rotation speed of the recording medium when recording an image on the image recording surface.

15. The recording method according to claim 13, wherein the rotation speed of the recording medium is changed periodically when drying the image recorded on the image recording surface.

16. A recording apparatus which records an image on a rotating recording medium while rotating the recording medium, the recording apparatus comprising:

a rotary driving unit which rotationally drives the recording medium;

an ink-jet head which ejects ink onto an image recording surface of the recording medium; and a shielding member which is disposed in proximity to the image recording surface over an area ranging from the vicinity of a center of rotation of the recording medium to an outer peripheral portion of the recording medium, wherein an inside of the shielding member is formed with an airflow path which returns an airflow, flowing along the recording medium from an upstream side in a direction of rotation of the recording medium, to the upstream side in the direction of rotation.

17. A recording apparatus which records an image on a rotating recording medium while rotating the recording medium, the recording apparatus comprising:

a rotary driving unit which rotationally drives the recording medium;

an ink-jet head which ejects ink onto an image recording surface of the recording medium; and a shielding member which is disposed in proximity to the image recording surface over an area ranging from the vicinity of a center of rotation of the recording medium to an outer peripheral portion of the recording medium, wherein the shielding member is disposed so as to face an entire region of the image recording surface of the recording medium, excluding a region on the image recording surface of the recording medium which is placed opposite to the ink-jet head.

* * * * *